May 10, 1966 L. CHILTZ ETAL 3,250,029
WATER FLOW CONTROL FOR STEAM IRONS
Filed Oct. 24, 1963
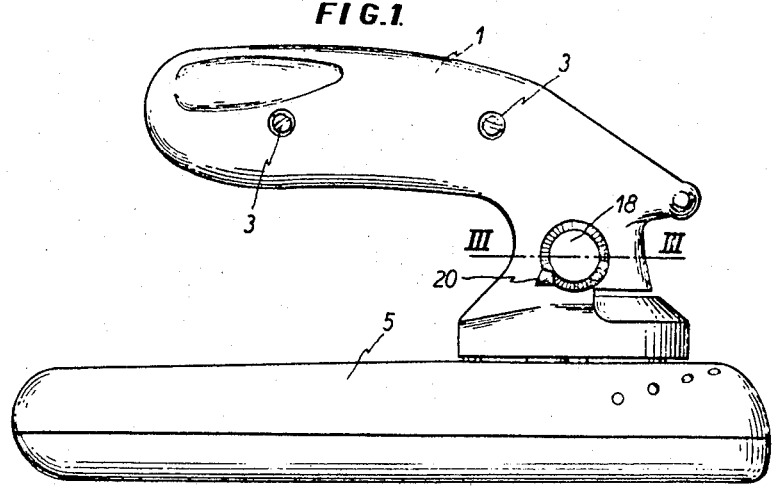
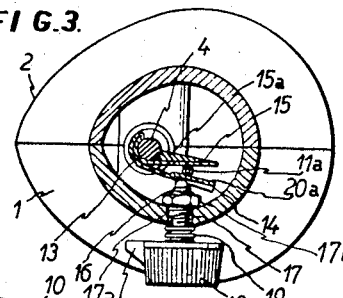
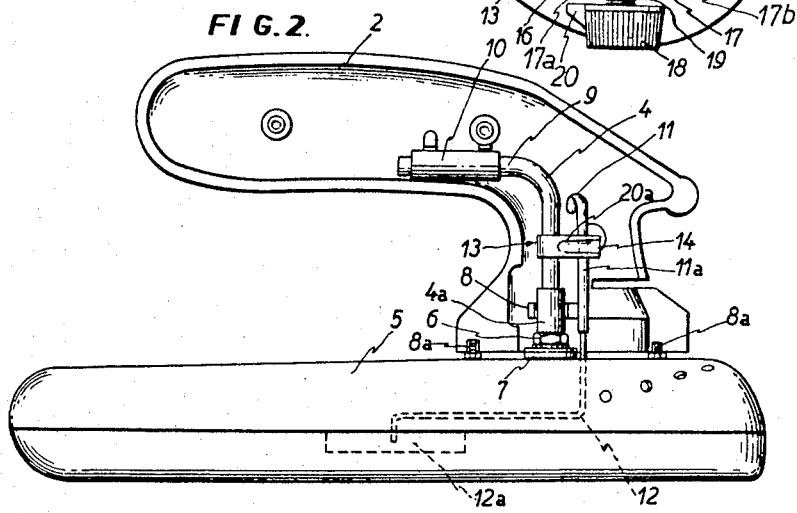

# United States Patent Office 3,250,029
Patented May 10, 1966

3,250,029
WATER FLOW CONTROL FOR STEAM IRONS
Louis Chiltz, 9 & 16 Rue du 4-Septembre, Bourg (Ain), France, and Louise Lobrichon-Bolomier, Marboz (Ain), France
Filed Oct. 24, 1963, Ser. No. 318,684
Claims priority, application France, Oct. 26, 1962, 389, Patent 1,343,057
2 Claims. (Cl. 38—77)

This invention relates to improvements in steam irons of the kind having an independent liquid tank and with a duct that leads the liquid from the tank to the vaporizing chamber of the iron, through the handle thereof.

In steam irons with an independent tank, said tank is usually located at a certain height so as to create a water column pressure, said pressure equalizing at the moment the steam pressure escapes from the iron. The user must be able to control at will the flow rate of this pressurized water, according to the iron warmth and the amount of steam which is desired. This flow rate must be variable at will from a value of zero to a maximum output as allowed by the iron power.

A method is known which comprises regulating the steam output by changing the height at which the water tank is located, but this repeated handling of such a tank is not considered as being practical. Another method comprises locating a valve on the water duct before the entrance thereof into the iron. Besides the fact that this method is not practical as regards handling, the method requires the use of a very accurate valve, as the inside bore of a water duct must be variable in a household iron from 0 to about 1 square millimeter crosssection; this method thus implies manufacturing difficulties and also maintenance ones, notably the danger of obturating the bore with the water impurities.

This invention has for its purpose to provide a simple apparatus for regulating the water supply to the laundry iron, this apparatus being easy and practical to use.

According to the invention, on the inside or at the inlet of the handle, part at least of a liquid supply duct is made of a flexible material, adjustable means being provided to enable a progressive obturation of this flexible duct, by clamping or by collapsing, in such a way that said duct may be in any condition from a completely open condition to a completely closed condition.

The adjustable means are comprised of a pressure element, such as a screw, that pushes at right angles inside the iron, on the flexible duct and which is provided on the outside of the iron with an operating element, stop-like elements being provided to limit the rotating of the pressure elements, on the one hand, to a completely open condition of the flexible duct and, on the other hand, to a completely obturated condition.

The adjustable means comprise a fixed bearing against which is located the flexible duct and a movable part which is located against said duct, opposite the fixed bearing, a pressure element being provided to thrust against the movable part and thus to progressively collapse the flexible duct against the fixed bearing.

The fixed bearing and the movable part are comprised of a spring metal blade which is coiled back against itself and one part of which is so attached as to be rigid against a central metal armature of the iron, while the remaining part of this doubled blade is still flexible and spring-like, the flexible duct being arranged between said two parts of the blade.

Other details and features of the invention will stand out from the description given below, by way of non-limitative example and with reference to the accompanying drawings, in which:

FIG. 1 is an elevation view of the laundry iron according to the invention.

FIG. 2 is a section and elevation view showing the inside of a steam iron embodying the regulating method according to the invention.

FIG. 3 is a section view along plane III—III of FIG. 1.

The handle of the laundry iron is comprised of two parts or half handles 1 and 2, which are made of molded Bakelite and which are assembled by means of screws 3. The whole handle is reinforced by an inside metal post which is comprised of a bent element 4 the threaded vertical base of which is designed to enable attaching thereof to the cover 5 of the iron, by means of nuts 6 and of heat-insulating washers 7. The half handles 1 and 2 are provided at the bottom thereof with a projection 8, the corresponding projections enclosing the post 4 with the interposition of an insulating sleeve 4a. At the upper part thereof, this post 4 is provided with a substantially horizontal part 9 for reinforcing the handle and which is located inside suitable housings thereof, a heat-insulating part being provided in 10. Moreover, the handle fits over the cover 5 of the laundry iron by means of small positioning bolts 8a which, attached by nuts on the cover 5, are engaged into small corresponding holes which are provided in the base of the handle, so as to prevent any swivelling of the handle around the post 4 thereof. The front bolt and the nut thereof are further used as bearing for the front base of the handle. It is moreover to be noted that the post 4 and these nuts 8a are of small cross-section to avoid any abnormal heating of the handle.

The duct 11 that supplies the water from the independent tank (not shown) enters the handle, goes down therethrough and leads with the lower end 12 thereof to the vaporizing chamber 12a of the iron, where said duct comprises the water supply nozzle.

A section 11a of the water duct is comprised of a flexible and resilient material while being heat resistant. It may be for instance a small length of silicone-basis synthetic material tubing.

The lower part 12 of the duct 11 is made of metal, while that part of the duct which lies outside the iron and conveys the cold water from a tank which is hanging at some height, may be made of some suitable flexible material.

To the post 4 is attached a spring blade 13 which is coiled back on itself so as to form two parts 14 and 15. The attachment of the blade on the post 4 will for example be made by soldering with a charge of material 15a which is large enough on that part 15 of the blade to make it rigid and comprising a fixed support. The part 14 of the blade remains flexible and resilient. The duct 11a is arranged between these two parts 14 and 15 by moving the resilient part 14 more or less closer to the fixed part 15, that is by collapsing more or less the duct 11a.

In this way, it will be possible to give to the duct 11a a certain number of positions from a condition of full opening of this duct down to a completely obturated condition, with a possibility of adjusting to any one of the intermediate conditions.

The means for moving the part 14 of the blade towards the support 15 is comprised of a pressure screw 16 which may engage the part 14. Said screw 16 goes through the handle by passing inside a threaded bushing 17a fitted in a bore 17 provided in the handle and locked by a nut 17b, the screw 16 being provided outside the handle with a control button 18 arranged with a spring 19. This button 18 is keyed on the screw 16 by a set screw in such a way that the position thereof is adjustable. This button 18 is provided with a projecting finger 20 abutting in the lower part of its circumference against the outline of the lower part of the handle which thus comprises end stops for the button 18 and thus for the screw 16. Of course, other stopping methods may be provided, notably for the screw 16 itself. Both end stops of the button 18 must in any case correspond respectively to a full opening of the duct 11a and to a complete obturating thereof.

The pitch of the screw 16 will of course be so chosen as to enable to go from one travel end to the other with less than one complete revolution of button 18.

Each adjusting position of the button 18 which corresponds to a given opening of duct 11a is stable due to the spring 19 which acts between said button and the iron handle.

To obtain a greater accuracy as regards the more or less complete obturation of the tube 11a and actually a better progressive movement for closing or opening, one of the parts 14 and 15 of the blade will be flat, while the other one will be provided with a boss directed towards the duct 11a, which is preferably at right angle to the lengthwise symmetry axis of said duct. In the embodiment shown, the flexible part 14 is provided with a boss 20a, while the fixed part 15 is left flat. In such a way, the pressure of the flexible part 14 on the duct 11a is exerted in a point, at least at the start.

Due to the inside smooth surface of the flexible duct 11a, there is a substantially reduced tendency to obturating by the water impurities. It is besides easy and not very expensive to replace this length of duct 11a, if it is worn down or eventually obturated.

It must be understood that the invention is in no way limited to the above embodiments and that many changes may be brought therein, without departing from the scope of the invention as defined by the appended claims.

The obturating of the duct 11a, which is made inside the handle, could for instance be made at the entrance of this duct into this handle. Other methods for pressing and collapsing other than the screw 16 and the double blade 13 could be provided and such means could moreover be arranged elsewhere than on the rigid post 4.

We claim:

1. In a steam iron, a liquid supply duct for leading liquid from an independent tank to a vaporizing chamber, said duct passing through a handle, a portion of said duct inside the handle including a flexible portion, adjustable means mounted on said handle including a pressure element and clamping means engaging said flexible portion, a reinforcing post inside the handle, said clamping means including a spring metal blade coiled back against itself, said blade including first and second portions, means attaching said first portion to said post, said first portion being covered by a stiffening material, said pressure element engaging the second portion, said flexible duct extending between said portions of the spring blade to enable progressive obturation of the flexible duct in such a way that said flexible duct may be in any condition from a completely open condition to a completely closed condition.

2. In a steam iron according to claim 1, in which the portion of the spring blade engaged by said pressure element includes a boss directed towards said flexible duct.

References Cited by the Examiner
UNITED STATES PATENTS 2,293,386   8/1942   Fitzgerald _____ 38—78
2,864,186   12/1958   Praud _____ 38—77

JORDAN FRANKLIN, *Primary Examiner.*